Oct. 26, 1926.

D. S. BEEBE 1,604,376

APPARATUS FOR UTILIZING LADLE CHILLS

Filed April 8, 1922

Inventor
D. S. Beebe,
Wm. F. Freudenreich
Atty

Patented Oct. 26, 1926.

1,604,376

UNITED STATES PATENT OFFICE.

DANIEL S. BEEBE, OF CHICAGO, ILLINOIS, ASSIGNOR TO THE VITROLITE COMPANY, OF PARKERSBURG, WEST VIRGINIA, A CORPORATION OF WEST VIRGINIA.

APPARATUS FOR UTILIZING LADLE CHILLS.

Application filed April 3, 1922. Serial No. 550,569.

Whenever a ladleful of molten glass is dipped from a tank or furnace, that portion of the glass in contact with the walls of the ladle begins to solidify and, when the surplus that is left in the ladle, after the pouring operation, is returned to the tank or furnace, it gives rise to certain objections which it is the object of the present invention to overcome. If a second ladleful of glass is dipped out of the tank or furnace at the spot where and immediately after a quantity of ladle chills has been returned, the product into which such second ladleful of glass is transformed will be imperfect because containing blisters and seeds. In other words, the more or less solidified ladle chill do not settle quickly in a tank or furnace of molten metal, and neither do they quickly resume a fluid condition through the absorption of heat from the contents of the tank or furnace. Heretofore it has been the practice to avoid dipping into a tank or furnace at the point where ladle chills have been returned, as long as this could be avoided; it being ordinarily possible to dip the ladle into a tank at only a comparatively few virgin spots. Consequently, while the first few ladlefuls of molten metal would yield a flawless product, subsequent dippings would yield a product containing blisters and seed.

The object of the present invention is to produce a simple and novel method by which ladle chills may be utilized in such a way as to avoid injury to the quality of the molten metal in the tank or furnace. A further object of the present invention is to produce a simple and novel apparatus for carrying out my invention.

Figure 1:
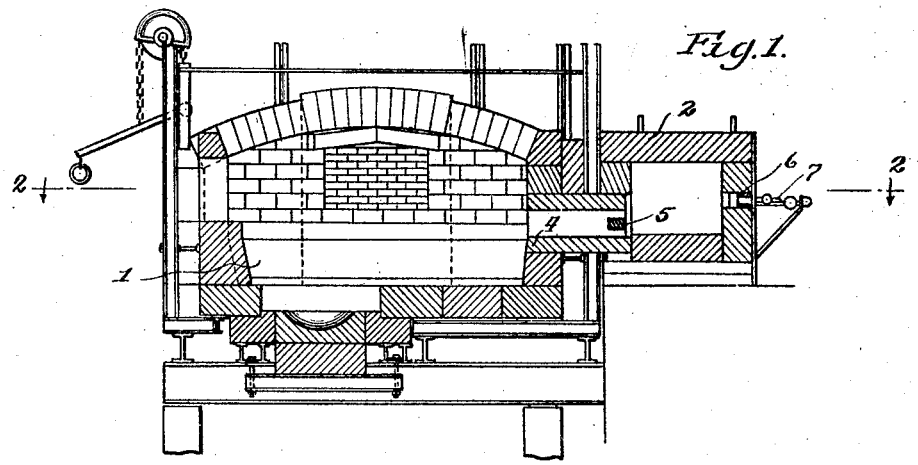
Figure 2:
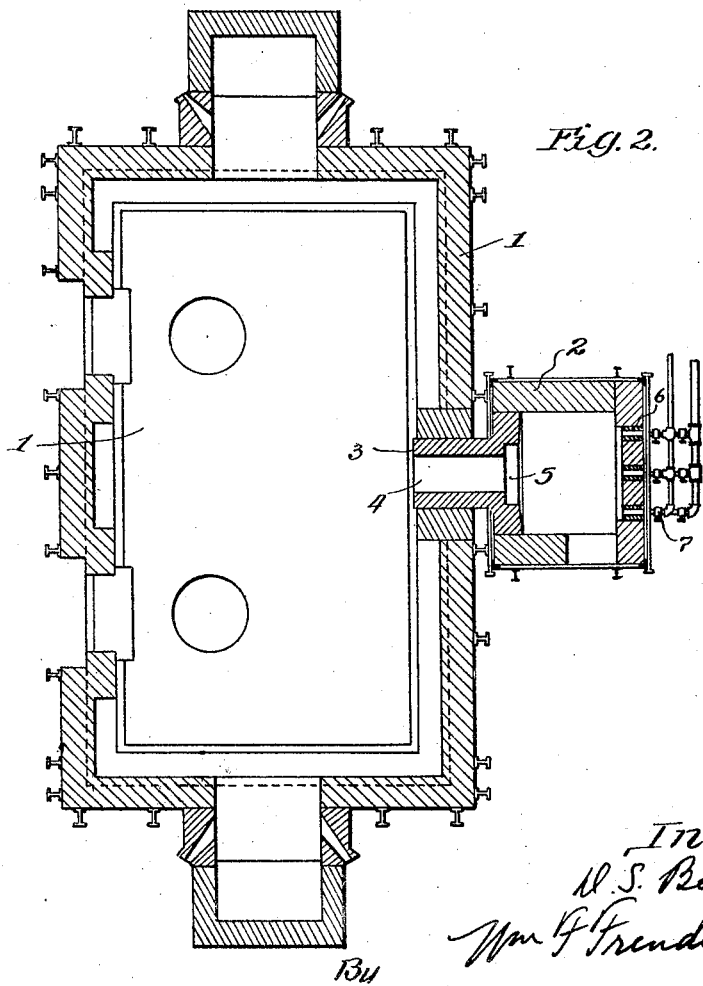

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a vertical section through a tank or furnace constructed and arranged to carry out my invention; and Fig. 2 is a section taken approximately on line 2—2 of Fig. 1.

Referring to the drawing, 1 represents any usual or suitable tank or furnace in which a body of molten glass or similar material is adapted to be maintained and from which it may be withdrawn by means of ladles for consumption. Beside the member 1 is a small auxiliary furnace 2 preferably placed so that the bottom thereof lies somewhat above the level of the molten metal in the main tank or furnace when the latter is full. The two furnaces are connected together by means of a spout 3 of refractory material, the bottom wall 4 of the spout being preferably inclined downwardly as it approaches the interior of the main tank or furnace. Extending across the outer end of the spout, that is the end next to the auxiliary furnace, is a horizontal vitreous bar or block 5 spaced apart from both the top and the bottom walls of the spout. Suitable tuyeres 6 and burners 7 are associated with the auxiliary furnace for the purpose of melting material in the auxiliary furnace.

In carrying out my invention, the ladle chills are not returned directly to the main tank or furnace but are deposited within the auxiliary furnace where they are fused or melted until they become fluid enough to flow by gravity down the gentle incline of the spout into the main body of metal in the main tank or furnace; the block or bar 5 serving as a skimmer and controlling the flow from the auxiliary furnace. It will thus be seen that the returned ladle chills may be completely remelted before being returned to the main body of molten metal and that therefore the main body of metal will remain in a homogeneous state and the product made therefrom will be of uniform texture and free from blisters and seeds, regardless of the number of ladlefuls that may be dipped out.

While I have illustrated and described my invention in connection with a single preferred form of apparatus, I do not desire to be limited to the particular details of construction thus illustrated and described; but intend to cover all methods and arrangements which come within the definitions of my invention constituting the appended claims.

I claim:—

1. In combination, a large main tank or furnace for initially producing the molten metal, a small auxiliary furnace, adapted to receive ladle chills and remelt them, a short connecting spout between said furnaces located above the level of the molten metal in the main furnace, and a cross bar extending horizontally across the spout adjacent to the auxiliary furnace at such a height as to prevent metal from flowing from the auxiliary furnace into the main furnace until it has been fully melted.

2. In combination, a large main tank or furnace for initially producing the molten metal, a small auxiliary furnace, adapted to receive ladle chills and remelt them, a short connecting spout between said furnaces located above the level of the molten metal in the main furnace, and means for preventing metal from flowing from the auxiliary furnace into the main furnace until it has been fully melted.

In testimony whereof, I sign this specification.

DANIEL S. BEEBE.